(12) United States Patent
Zweig et al.

(10) Patent No.: US 10,102,351 B2
(45) Date of Patent: Oct. 16, 2018

(54) DECOUPLING RIGHTS IN A DIGITAL CONTENT UNIT FROM DOWNLOAD

(75) Inventors: Jonathan M. Zweig, Cupertino, CA (US); James H. Woodyatt, San Francisco, CA (US)

(73) Assignee: APPLE INC., Cupertino, CA (US)

(*) Notice: Subject to any disclaimer, the term of this patent is extended or adjusted under 35 U.S.C. 154(b) by 1555 days.

(21) Appl. No.: 11/550,701

(22) Filed: Oct. 18, 2006

(65) Prior Publication Data
US 2007/0233602 A1 Oct. 4, 2007

Related U.S. Application Data

(63) Continuation-in-part of application No. 11/397,149, filed on Apr. 4, 2006, now Pat. No. 8,086,535.

(51) Int. Cl.
| | |
|---|---|
| *G06F 21/10* | (2013.01) |
| *G06Q 20/38* | (2012.01) |
| *H04L 9/08* | (2006.01) |
| *H04L 9/32* | (2006.01) |
| *H04L 29/06* | (2006.01) |

(52) U.S. Cl.
CPC .......... *G06F 21/10* (2013.01); *G06Q 20/382* (2013.01); *H04L 9/088* (2013.01); *H04L 9/3297* (2013.01); *H04L 63/10* (2013.01); *G06F 2221/2137* (2013.01); *G06F 2221/2149* (2013.01); *H04L 2209/603* (2013.01); *H04L 2463/101* (2013.01)

(58) Field of Classification Search
USPC ................ 395/184–186; 380/45; 705/51, 59; 726/26
See application file for complete search history.

(56) References Cited

U.S. PATENT DOCUMENTS

| | | | |
|---|---|---|---|
| 5,892,900 A * | 4/1999 | Ginter et al. ................... 726/26 |
| 6,385,596 B1 * | 5/2002 | Wiser ...................... G06F 21/10 |
| | | | 369/84 |
| 6,574,609 B1 * | 6/2003 | Downs et al. .................. 705/50 |
| 6,983,371 B1 | 1/2006 | Hurtado et al. |
| 6,990,584 B1 | 1/2006 | Yoshiura et al. |
| 7,062,500 B1 | 6/2006 | Hall et al. |
| 7,249,107 B2 | 7/2007 | Yaacovi |
| 7,546,532 B1 * | 6/2009 | Nichols et al. ............... 715/716 |
| 2002/0194133 A1 * | 12/2002 | Castueil .................. G06F 21/10 |
| | | | 705/53 |
| 2003/0125964 A1 | 7/2003 | Chang et al. |
| 2003/0135464 A1 * | 7/2003 | Mourad et al. ................. 705/50 |

(Continued)

OTHER PUBLICATIONS

International Search Report, PCT/US07/65771, 4 pages, dated Dec. 21, 2007.

*Primary Examiner* — Tsan-Yu J Huang
(74) *Attorney, Agent, or Firm* — Morgan, Lewis & Bockius LLP

(57) ABSTRACT

Systems and methods for enabling a user to obtain rights in a legitimate copy of a digital content unit without downloading the copy from a digital content store are provided. The systems and methods provide an encrypted copy of a digital content unit to a first user and transcript the encrypted copy to generate the legitimate copy to a second user. The encrypted copy is encrypted with a first encrypt key that may be associated with the first user and the legitimate copy is encrypted with a second encrypt key that may be associated with the second user.

23 Claims, 6 Drawing Sheets

(56) References Cited

U.S. PATENT DOCUMENTS

| | | | |
|---|---|---|---|
| 2004/0107356 A1* | 6/2004 | Shamoon | H04L 63/0428 713/193 |
| 2004/0107368 A1* | 6/2004 | Colvin | G06F 21/121 726/30 |
| 2004/0128324 A1* | 7/2004 | Sheynman | G06F 21/10 |
| 2004/0196972 A1* | 10/2004 | Zhu et al. | 380/45 |
| 2004/0225894 A1* | 11/2004 | Colvin | G06F 21/121 726/27 |
| 2005/0172154 A1* | 8/2005 | Short | H04H 60/23 726/5 |
| 2005/0283791 A1 | 12/2005 | McCarthy et al. | |
| 2006/0048223 A1 | 3/2006 | Lee et al. | |
| 2006/0095792 A1* | 5/2006 | Hurtado | G06F 21/10 713/189 |
| 2006/0156352 A1* | 7/2006 | Smith | H04N 7/167 725/86 |
| 2006/0184997 A1* | 8/2006 | La Rotonda | G06Q 10/10 726/2 |
| 2007/0100756 A1* | 5/2007 | Varma | G06F 21/10 705/51 |
| 2007/0208953 A1* | 9/2007 | Durand | G06F 21/10 713/193 |
| 2008/0148069 A1 | 6/2008 | Tsuria | |
| 2009/0048978 A1 | 2/2009 | Ginter et al. | |

* cited by examiner

DECOUPLING RIGHTS IN A DIGITAL CONTENT UNIT FROM DOWNLOAD

CROSS-REFERENCE TO RELATED APPLICATIONS

FIELD OF THE INVENTION

The present invention relates generally to digital content protection and, more particularly, to cryptographic techniques for obtaining a right in a legitimate copy of a digital content unit without downloading the copy.

BACKGROUND INFORMATION

The explosion of the Internet has revolutionized the ways in which information is disseminated and shared. Users are no longer tied to the basic newspaper, television and radio distribution formats and their respective schedules to receive their written, auditory, or visual information. Likewise, users no longer need to obtain information or data stored in a so-called "hard" or physical format, such as on a compact disk (CD) or digital versatile disk (DVD). At any given time, massive amounts of information are exchanged electronically by millions of users worldwide using the Internet not only for communication but also for research, education, business, and entertainment. Information can now be downloaded, streamed or delivered directly to computer desktops, laptops, set-top boxes, entertainment units, personal digital assistants ("PDAs"), wireless telephones, digital music players, and other portable devices, providing virtually unlimited information access to users.

This information is often disseminated as digital content in the form of digital content "units" or files, such as audio, video, graphics, or multimedia files, that may be shared by users, devices, and networks. For example, users may now listen to audio broadcasts and live music concerts on various web sites or download and play audio files as desired. The audio files may be downloaded from digital content stores, which are basically repositories of digital content units available for user access. Often a per unit fee or subscription is charged for access to digital content units. Examples of digital content stores offering audio downloads and other multimedia services include the iTunes Music Store, operated by Apple Computer, Inc., of Cupertino, Calif., the Yahoo! Music Store, operated by Yahoo!, Inc., of Sunnyvale, Calif., the Napsterm web site operated by Napster, Inc., of Los Angeles, Calif., Rhapsody™, the Rhapsody™ music services operated by RealNetworks, Inc., of Seattle, Wash., and the eMusic web site, available from eMusic.com, Inc., of New York, N.Y., among others. Such digital content stores are now a staple of the Internet and have fundamentally altered the way digital content is distributed and enjoyed by users everywhere. The iTunes Music Store, for example, has already sold more than 1 billion audio files to users.

Likewise, digital content units may be transmitted across satellite, cable or wireless networks. Digital content units may be provided to televisions, radios and stereos, and so forth by various content providers. Digital content units may, in some cases, be stored locally by a user on a hard disk or other storage medium connected to a network. As one example, a digital video recorder may be connected to a satellite or cable network and store digital content units for later review.

The proliferation of digital content and the ease with which it is created, manipulated, copied, and distributed has led to new challenges for digital content creators, owners, and providers. Those having vested interests in the content have to be especially careful in determining the best means to effectively manage the distribution, use and monitoring of their digital content assets and protect them from piracy. Digital content assets are protected by copyright laws, but those laws merely punish, not necessarily prevent the unauthorized copy, manipulation and distribution of digital content.

To address this concern, content protection technologies have to be deployed. Content protection technologies are those technologies used to monitor and control access to digital content. For example, a digital content store such as the iTunes Music Store may deploy these technologies to ensure that digital content units obtained from its store will not be improperly resold, redistributed or copied by unauthorized users. When a user obtains one or more digital content units from a digital content store, the digital content units may be protected so that only the purchasing user is granted the right to access the digital content units. Content protection technologies employed by the digital content store can prevent the other user from accessing the digital content unit. For example, they can prevent the other user from listening to an audio file obtained by the purchasing user.

Content protection technologies typically use technical and legal mechanisms to protect digital content against unauthorized use. The technical mechanisms may involve cryptographic techniques for securing the digital content, rights thereto, and content distribution. They may also involve the use of "Digital Rights Management" ("DRM") technologies for protecting the rights and interests in distributing or accessing the digital content. "Rights" may include, for example, the right to view the digital content unit, the right to make copies of the digital content unit, the right to redistribute the digital content unit, to publicly display the digital content unit, to modify or sample the digital content unit, to create derivative works of the digital content unit, and so forth. Essentially, "rights" as used herein may include one or more rights common under United States and foreign copyright law. Further, such rights may be restricted or unlimited. As yet another example, a right may be restricted as to the location in which the right may be exercised, the number of times the right may be exercised, to a particular timeframe in which the right may be exercised, the way in which the right may be exercised, and so on.

Cryptographic techniques apply mathematical and/or linguistic principles to secure a given digital content unit. A digital content unit may be encrypted prior to its distribution to a user, i.e., converted into an unreadable format, and decrypted to recover the digital content in its original form for the user to access. The encryption and decryption process may be controlled by the use of a key, which dictates how the unreadable format is produced and decoded. There are three broad types of cryptographic techniques available today for protecting digital content: secret key (or symmetric) techniques, public key (or asymmetric) techniques, and hash function techniques. (Although hash techniques are not cryptographic techniques per se, they are included herein for purposes of the following discussions.) These techniques may be used separately or in combination, such as in a public key/secret key hybrid technique or a key and hash technique. Such techniques may be layered, with credentials at one level protecting different credentials at another (lower) level. "Credentials" are elements or items used to access protected data, be it another credential or digital content. Keys are one example of credentials. As used herein, the term "key" is understood to have the broader meaning of a credential.

Secret key techniques involve the use of a single and secret key for both encryption and decryption. The secret key must be known to both the sender and the receiver, which may present a challenge in how the key itself is to be distributed and protected from others. Common secret key techniques include the Data Encryption Standard ("DES") and its successor, the Advanced Encryption Standard ("AES"), among others.

Public key techniques involve the use of two keys—one for encryption and the other for decryption—that are generally mathematically related so that knowledge of one key does not allow the other key to be easily determined. One key is designated a public key and may be distributed and advertised to anyone while the other key is a private and secret key known only to its holder. One advantage of public key techniques is that they may be used to authenticate the sender of a digital content unit. For example, if Alice encrypts a digital content unit using her private key and sends the encrypted digital content unit to Bob, Bob may decrypt the encrypted digital content unit using only Alice's public key, confirming that Alice was the one who sent the encrypted digital content unit to Bob. Common public key techniques include the Public Key Cryptographic Standards ("PKCSs") and the RSA algorithm, designed by RSA Security, Inc., of Bedford, Mass.

Hash techniques are one-way cryptographic techniques involving the generation of a mathematical function derived from the digital content in a given digital content unit, referred to as a hash function, that makes it difficult for the digital content to be recovered. These techniques are typically used to provide a measure of the integrity of a file, i.e., to verify whether a given digital content unit has been altered. Since two different digital content units typically do not generate the same hash function, knowing the hash function for a particular digital content permits comparison of the hashed content to the unhashed content. This, in turn, may give an indication of whether the digital content unit has been modified. Hash functions may be used together with secret key and public key techniques as a way to further ensure the integrity of a digital content unit. Common hash functions include the Message Digest ("MD") algorithms such as MD2, MD5 and RIPEMD as well as the Secure Hash Algorithm ("SHA").

An example of a common content protection technology relying on cryptographic techniques to protect digital content includes the Content Protection for Prerecorded Media ("CPPM") technology for protecting digital content stored on prerecorded digital versatile disks ("DVD"). CPPM selectively encrypts disc sectors that can only be decrypted during playback by licensed products, such as DVD players. Critical information, e.g., decryption keys, required to unlock the digital content stored in the prerecorded DVDs is located in protected regions of the discs accessible only to the licensed products and under carefully regulated circumstances. Without these keys the encrypted digital content is unusable. Performing bit-for-bit duplication or simply copying files from the protected DVD to a writable DVD, hard drive or other storage medium is prohibited unless the DVD's key is known. Writable DVD products employ several safety safeguards to prevent valid decryption keys from ever being written to these discs. In addition, software for watching DVDs is generally "trusted," such that it does not allow a user to watch an unauthorized copy of a DVD (i.e. one lacking the decryption key).

Additional examples of common content protection technologies relying on cryptographic techniques include the "Fairplay" scheme used by digital content stores, such as the iTunes Store. Digital content stores may use a hybrid of secret key and public key techniques to protect their digital content, or may employ multiple keys. They may also use hash techniques in combination with, say, a hybrid secret key/public key technique.

For example, in the Fairplay system, two keys are used to protect a digital content unit. When a user obtains a digital file from the iTunes Store (possibly through purchase), the user downloads an encrypted audio file that has been encrypted with a random key. The random key is stored in a header of the digital content unit; this header is encrypted with an encryption key specifically linked to the user. Thus, the user's key may be used to decrypt the header of the digital content unit and retrieve the random key, which may then decrypt the remainder of the digital content unit. In this manner, each digital content unit is randomly encoded throughout the majority of its length with a different random key. This makes it difficult for a third party who obtains copies of multiple digital content units associated with a single, legitimate user to guess or derive that legitimate user's personal key. This, in turn, may reduce the unauthorized copying and/or distribution of digital content units.

Because digital content files may be storage and bandwidth intensive, downloads of a digital content unit from a digital content store may take substantial time depending on the characteristics of the network and user demand for the digital content unit during the downloads. For example, a 6 gigabyte movie stored on a DVD may require multiple hours to download across a typical high-speed Internet connection. Users having access to an already legitimately-obtained copy of a given digital content unit, e.g., Bob in the example above having access to the audio file obtained by Alice, may be enticed to find a way to circumvent the content protection technologies and illegally copy without incurring the costs and download time required for purchasing their own copy from the digital content store. By contrast, copying one or more digital content units from a storage medium (including, for example, a CD, DVD, hard disk, flash memory, portable hard disk and so forth) directly to a second storage medium associated with a computer is typically much faster than downloading the same digital content unit(s) across a network connection. Likewise, digital content may be rapidly shared between computers across a wired or wireless local area network (LAN).

In addition to enhancing currently available content protection technologies to protect digital content units from illegal break-ins, it would also be desirable to provide users having access to already legitimately-obtained copies of digital content units a legal right to play, view, or manipulate those copies. Besides savings in download times (and potentially monetary costs) for those users having access to already legitimately-obtained copies, such measure may diminish desire to produce illegal copies of digital content units obtained from a digital content store.

There is therefore a need to provide systems and methods for granting users a legal right to own a copy of a digital content unit without having to obtain or download another copy of the same digital content unit from a digital content store.

There is yet a further need to provide systems and methods for decoupling the purchasing of rights in a copy of a digital content unit from the downloading of the digital content unit.

SUMMARY OF THE INVENTION

In view of the foregoing, a general object of the present invention is to provide systems and methods for granting users a right in a copy of a digital content unit without having to download another copy of the same digital content.

In one aspect, the present invention provides systems and methods for transcrypting or converting a digital content unit encrypted with a given key into a decryptable copy of the digital content unit for a user having a legal right to obtain a copy of the digital content unit.

In another aspect, the present invention provides systems and methods for decoupling the purchasing of rights in a copy of a digital content unit from the downloading of the digital content unit.

These and other aspects of the present invention are accomplished by providing systems and methods for enabling a user to obtain a right or rights in a legitimate copy of a digital content unit without having to download the copy from, for example, a digital content store. A digital content unit, as generally referred to herein, may be any unit or file representing and storing digital content such as plain data, audio, video, graphics, or other multimedia content, that may be shared across users, devices, and networks. A digital content store, as generally referred to herein, may be any repository of digital content units available for user access often on a per unit fee or subscription basis. Such a store may sell, for example, audio, video, combinations of both, computer software, databases, and any other data that may be digitally stored and transmitted.

The present invention is equally applicable to situations where a user has obtained a digital content unit and one or more rights therein, and wishes to copy the digital content unit as provided for within those rights. For example, a user may wish to (and have the right to) make a copy of a CD or DVD, perhaps for backup or archival storage. As yet another example, a user may obtain a CD, DVD, or digital content unit stored on a hard disk or flash memory from the digital content unit's owner, and be asked to make a copy of the digital content unit for the owner. Generally, many digital content units stored on CDs, DVDs, and other storage media are difficult to copy due to copy protection schemes, even if such copying is permitted to the user's rights.

Further, in some cases, such digital content units are not copy-protected, and so making copies (authorized or unauthorized) is particularly simple. Embodiments of the present invention may be likewise applicable to this situation.

The digital content store may have a digital content distribution system for handling the distribution of digital content units to users on various user devices capable of accessing the digital content represented in the digital content units for the users to enjoy. The user devices may be, for example, computer desktops, laptops, set-top boxes, entertainment units, personal digital assistants ("PDAs"), wireless telephones, digital music players, and other portable devices capable of playing, displaying, and performing other actions on the digital content represented in the digital content units. A user device may have a digital content user system capable of receiving digital content units from the digital content store and enabling its users to enjoy the digital content represented in the digital content units. Accordingly, the digital content distribution system in the digital content store communicates with the digital content user system in the user device to transmit/receive digital content unit information to/from users.

In one exemplary embodiment, content protection technologies applying cryptographic techniques are employed by the digital content distribution system in the digital content store to protect the digital content units available therein for access by users. The content protection technologies generally involve encrypting each digital content unit with an encrypt key to generate an encrypted digital content unit for access by a user. The user may access the encrypted digital content unit by paying a monetary fee for the digital content unit or as part of a subscription in which the user has access to a given number of digital content units for a prescribed period of time within a given subscription fee. The user may also be granted access to the digital content unit without having to pay any fees. The encrypt key may be related to the digital content unit, associated with the user authorized to access the encrypted digital content unit and/or associated with the digital content store. The content protection technologies employed by the digital content store may involve a combination of secret key, public key and/or hash techniques to protect the digital content units available therein.

According to this exemplary embodiment, the user accessing an encrypted digital content unit may download the encrypted digital content unit to a user device. The digital content user system in the user device may include a trusted software, e.g., a trusted client software, that is able and authorized by the digital content store to access the digital content in the digital content unit. A trusted software, as generally referred to herein, may be any software that operates as expected within its design and policy and is intended for authorized and trusted users only. A trusted user, as generally referred to herein, may be a user authorized to use the trusted software and who does not and is not able to make unauthorized use of the software, make unauthorized attempts to break into the trusted software or offer it illegally to other untrusted users.

The digital content in the digital content unit may be accessed with the trusted software by first decrypting the digital content unit with a key authorized only for that user. The key may be a secret key associated with the user and/or a key associated with the software authorized for use only by that user. For example, the user may download the encrypted digital content unit to devices such as computer desktops, laptops, set-top boxes, entertainment units, personal digital assistants ("PDAs"), wireless telephones, digital music players, and other portable devices capable of playing, displaying, and performing other actions on the digital content represented in the digital content unit. Each device may be equipped with a software capable of accessing the digital content unit only by the user authorized and entitled to do so, e.g., the user who obtained and downloaded the digital content unit from the digital content store.

In another exemplary embodiment, each encrypted digital content unit may include an unencrypted header therein. In this exemplary embodiment, each digital content unit in the digital content store is encrypted with a unique key based on the header and a secret key associated with a user. The unique key may be, for example, a cryptographic hash of the header and the secret key associated with the user. The digital content in the encrypted digital content unit may be accessed by the user authorized to do so by first generating a decrypt key based on the header and the secret key associated with the user. The decrypt key may be, for example, generated as the cryptographic hash of the header and the secret key associated with the user. Because the header is unique to each digital content unit, each digital content unit is encrypted with a unique key, even for the same user.

In this embodiment, the digital content user system residing in the user device authorized by the digital content store to access the digital content in the encrypted digital content unit may include an untrusted software, e.g., an untrusted client software. An untrusted software, as generally referred to herein, may not guarantee that all of its users are trusted users, that is, the untrusted software may not guarantee that it is fully protected against unauthorized use, distribution, break-ins and other unauthorized actions. In this case, encrypting each digital content unit with a different key, regardless of whether it is for a single user, may further protect the encrypted digital content unit from being prey to unauthorized uses of the untrusted software.

Each time a user purchases and/or downloads an encrypted digital content unit, a different decrypt key is generated. The decrypt key, which may be generated as the cryptographic hash of the header associated with the encrypted digital content unit and the secret key associated with the user, may be generated by the digital content store and provided to the user authorized to download the digital content unit together with the encrypted digital content unit or it may generated by the untrusted software residing in the user device authorized by the digital content store to access the digital content in the digital content unit.

In both these exemplary embodiments, i.e., in the case of a trusted software or an untrusted software, a user having access to a copy of an encrypted digital content unit intended for another user, e.g., a purchasing user, may be granted a legal right to access the copy without having to download another copy of the encrypted digital content unit from a digital content store. The user having access to the copy of the encrypted digital content unit may be able to access the digital content therein by requesting permission to do so from the digital content store wherefrom the encrypted digital content unit was obtained by the other user, e.g., the purchasing user.

For example, the digital content store may offer users the right to purchase a legitimate copy of a digital content unit without downloading it. The users having access to a copy of an encrypted digital content unit may purchase (or otherwise legitimately obtain) such right from the digital content store in order to access the digital content in the copy. Because the encrypted digital content unit was encrypted and authorized solely for the user purchasing and/or downloading it from the digital content store, the user merely having access to a copy of that encrypted digital content unit may, when purchasing the right to access the digital content therein, purchase the right to decrypt the copy for his/her own use. This way, if Alice, for example, purchases an encrypted digital content unit from the digital content store and Bob has access to a copy of the encrypted digital content unit obtained by Alice, Bob will be able to obtain from the digital content store the legal right to access the copy. Bob will be able to decrypt the copy of the encrypted digital content unit for his enjoyment even though the encrypted digital content unit was encrypted with a key associated with Alice. Bob will be able to access the digital content in the copy without having to download another copy from the digital content store.

In the one exemplary embodiment involving a trusted software, a user having a trusted client software in a user device and having access to a copy of an encrypted digital content unit is given the right to decrypt the copy of the encrypted digital content unit with the key able to decrypt the encrypted digital content unit. The key able to decrypt the encrypted digital content may be, for example, a key associated with the user who purchased and/or downloaded the encrypted digital content unit from the digital content store. Because this decrypt key is known to the digital content store, the trusted client software may, for example, retrieve the decrypt key from the digital content store, decrypt the copy with the decrypt key and re-encrypt the copy with a key associated to the user having access to the copy. In the Alice-Bob example above, with Alice purchasing and/or downloading the encrypted digital content unit from the digital content store, Bob having access to a copy of the encrypted digital content unit, and the encrypted digital content unit being encrypted with a key associated with Alice, the trusted client software in Bob's device may obtain Alice's decrypt key from the digital content store, decrypt the copy with Alice's decrypt key and re-encrypt the copy with Bob's key for Bob to enjoy.

In the other exemplary embodiment involving an untrusted software, when the encrypted digital content unit has a unique unencrypted header associated with it, the user having access to a copy of the encrypted digital content unit may, when obtaining a right from the digital content store to access the digital content in the copy without having to download another copy of the encrypted digital content unit from a digital content store, retrieve the unencrypted header from the copy and provide it to the digital content store in order to obtain from the digital content store the key to decrypt the copy. For example, the encrypted digital content unit may be encrypted with a unique key based on the header and a secret key associated with the user who purchased and/or downloaded the encrypted digital content store from the digital content store, e.g., Alice. The unique key may be, for example, a cryptographic hash of the header and the secret key associated with that user, e.g., Alice.

Because the digital content store knows the secret key associated with the user who purchased and/or downloaded the encrypted digital content store from the digital content store, the digital content store may, when provided the unencrypted header associated with the copy of the encrypted digital content by the user having access to the copy, generate the key for decrypting the copy by computing the cryptographic hash of the header and the secret key associated with the user who purchased and/or downloaded the encrypted digital content store from the digital content store. The digital content store may provide this decrypt key to the user having access to the copy, e.g., Bob, so that the client software in the user's device may decrypt the copy for that user to enjoy. Similar to the embodiment involving the trusted software, the digital content store may provide the decrypt key to the untrusted software residing in the user device of the user having access to the copy, e.g., Bob's device, or the untrusted software may retrieve the decrypt key therefrom. The untrusted software may then decrypt the copy with the decrypt key, e.g., the decrypt key associated with Alice, and re-encrypt it with an encrypt key associated to the user having access to the copy, e.g., with the encrypt key associated with Bob.

One embodiment of the present invention takes the form of a method for providing access to a digital content unit, including the operations of determining if the digital content unit is authorized, in the event the digital content unit is authorized, presenting a first content of the digital content unit, and, in the event the digital content unit is not authorized, presenting a second content of the digital content unit. Another embodiment of the present invention takes the form of a method for authorizing a digital content unit, including receiving a request to authorize the digital content unit, determining if the digital content unit is fully authorized, determining if the request is legitimate, and, in the event the digital content unit is not fully authorized and the request is legitimate, fully authorizing the digital content unit.

Still another embodiment of the present invention takes the form of a digital content unit, including a first segment and a second segment appended to the first segment, wherein the first segment does not require authorization to be legitimately accessed, and the second segment requires authorization to be legitimately accessed.

Advantageously, the systems and methods of the present invention enable users to have one or more rights in a legitimate copy of a digital content unit without having to purchase or download another copy of the same digital content unit from a digital content store. Further, the systems and methods of the present invention enable digital content stores to decouple the acquisition of rights in a legitimate copy of a digital content unit from the downloading of the digital content unit.

BRIEF DESCRIPTION OF THE DRAWINGS

The accompanying drawings, which are somewhat schematic in some instances and are incorporated in and form a part of this specification, illustrate several embodiments of the invention and, together with the description, serve to explain the principles of the invention.

DETAILED DESCRIPTION OF EMBODIMENTS OF THE INVENTION

Exemplary Environment and Embodiment

Figure 1:
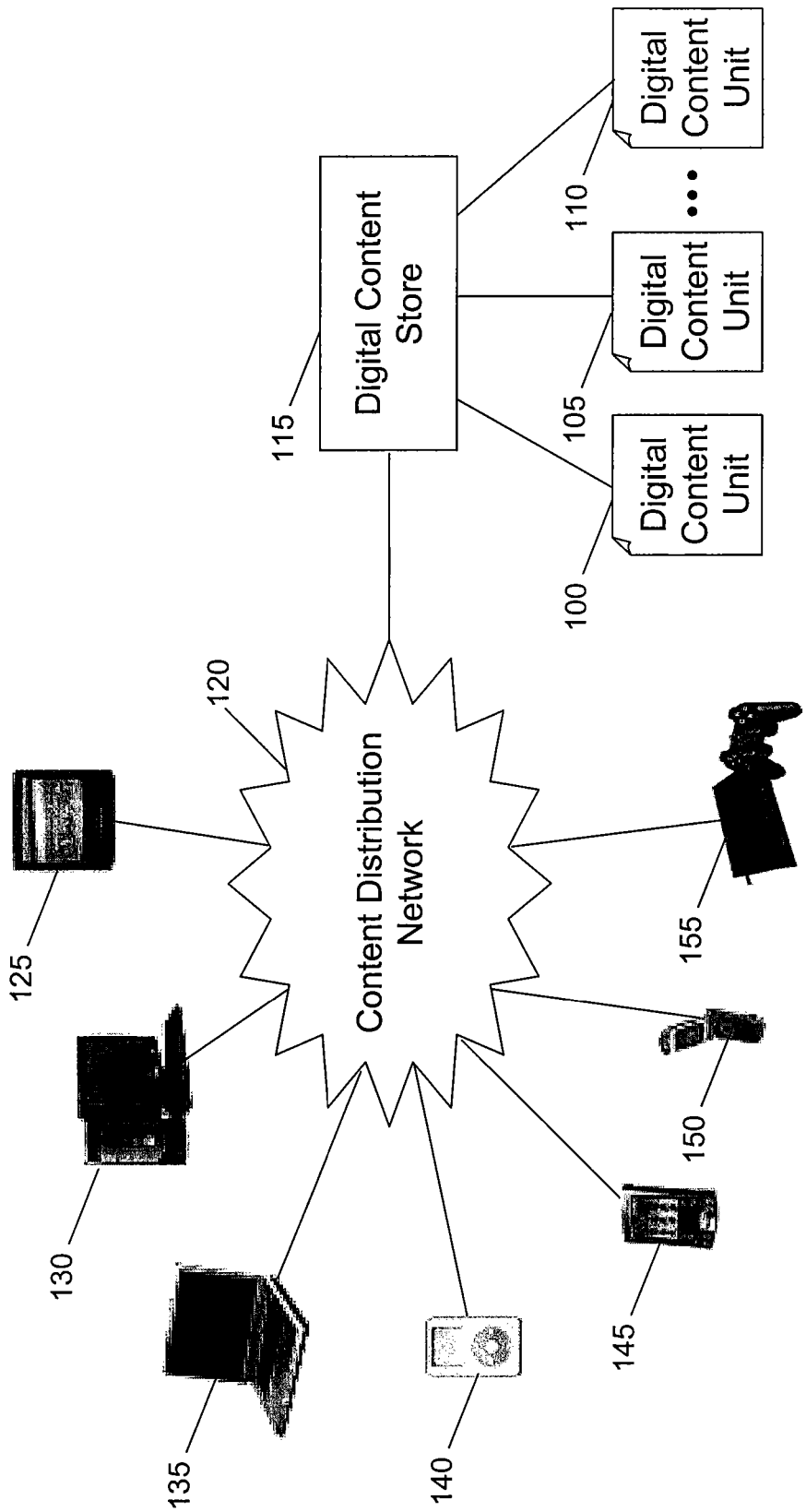
FIG. 1 shows a schematic diagram of an exemplary environment in which the systems and methods of the present invention operate.

A schematic diagram of an exemplary environment for an exemplary embodiment of the present invention is illustrated in FIG. 1. Generally, in accordance with exemplary embodiments of the present invention, systems and methods are provided for enabling a user to have one or more rights in a legitimate copy of a digital content unit without having to download the copy from, for example, a digital content store. A digital content unit, such as digital content units 100, 105 and 110, may be any unit or file representing and storing digital content such as plain data, audio, video, graphics, or other multimedia content, that may be shared across users, user devices, and networks.

Digital content store 115 may be any repository of digital content units available for user access. Examples of digital content stores include the iTunes Music Store, available from Apple Computer, Inc., of Cupertino, Calif., the Yahoo! Music Store, available from Yahoo!, Inc., of Sunnyvale, Calif., the Napster™ web site available from Napster, Inc., of Los Angeles, Calif., Rhapsody™, the digital music service available from RealNetworks, Inc., of Seattle, Wash., and the eMusic web site, available from eMusic.com, Inc., of New York, N.Y., among others. Further, a television, radio, or Internet broadcast (such as a podcast) may be part of, or affiliated with, a digital content store. It should be noted that the entity providing the digital content unit (such as a broadcaster or distributor) may be separate from the entity providing access to or operating the digital content store. Digital content units 100, 105 and 110 may be available to users on a per unit fee or as part of a subscription. For example, users may have access to a given number of digital content units (or unlimited access) for a prescribed period of time within a given subscription fee. Users may also be granted access to digital content units 100, 105, and 110 without having to pay any fees.

Digital content store 115 may distribute digital content units 100, 105, and 110 to users via content distribution network 120. Content distribution network 120 may be any information network capable of transmitting digital content information among multiple parties, for example, content distribution network 120 may be the Internet or any other wired or wireless network of varying reach such as a LAN, a wide area network, satellite network, cable network, and so on. Such networks may include, for example, radio, television, and other media networks presently known or hereafter discovered.

Digital content store 115 generally facilitates the distribution of digital content units 100, 105, and 100 to users on various user devices capable of accessing the digital content represented in digital content units 100, 105, and 110. The user devices may be, for example, a television and entertainment unit 125, computer desktop 130, laptop 135, personal multimedia player 140, personal digital assistant 145 or other handheld computing device, wireless telephone 150, video game and entertainment unit 155, or any other device capable of playing, displaying, and performing other actions on the digital content represented in digital content units 100, 105, and 110.

Figure 2:
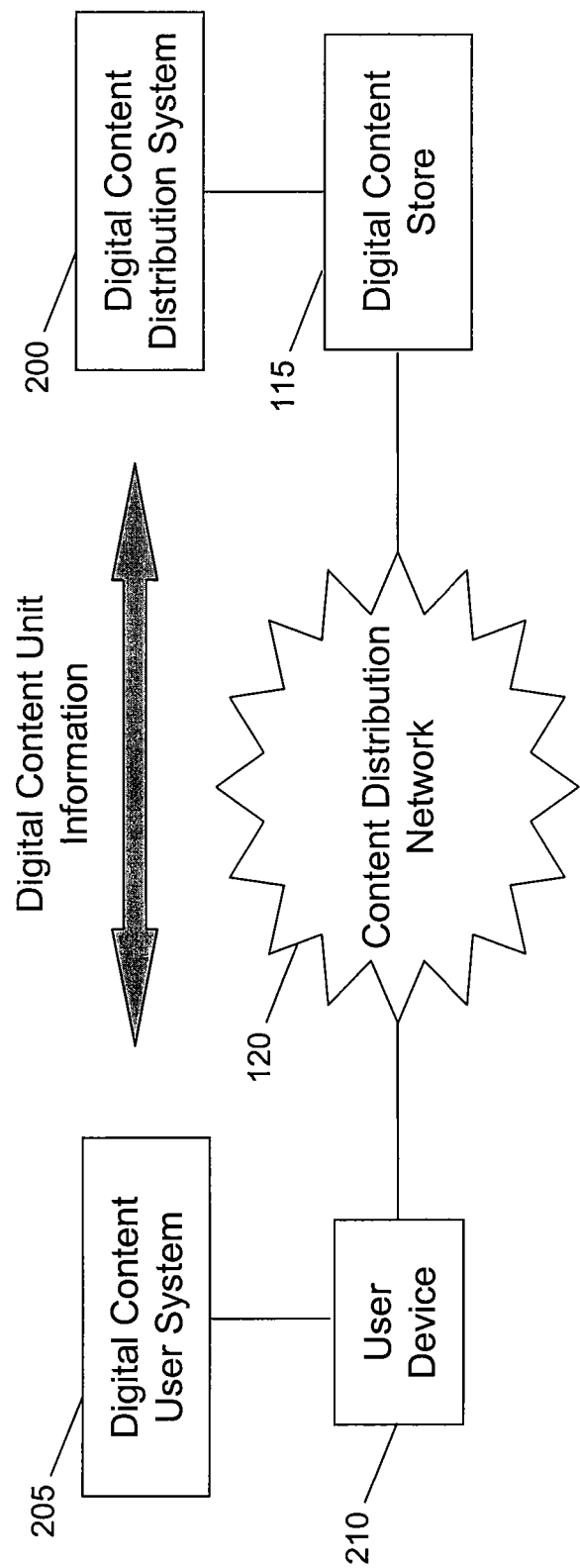
FIG. 2 shows a schematic diagram of an exemplary system for managing digital content according to the principles and embodiments of the present invention.

An exemplary system for managing digital content according to certain exemplary principles and embodiments of the present invention is shown in FIG. 2. Digital content store 115 may include or interact with a digital content distribution system 200. The digital content distribution system 200 may facilitate the distribution of digital content units to users on various user devices capable of accessing the digital content represented in the digital content units. Digital content distribution system 200 may include software routines and associated hardware, e.g., a server, for handling all aspects involved in the distribution of digital content units to users, such as storing digital content units for users' to access, processing users' requests for digital content units, processing users' personal information for, for example, creating users' accounts, and processing users' financial information for handling users' legitimate and/or authorized acquisitions of digital content units.

Digital content distribution system 200 may also include one or more software routines and associated hardware for protecting the digital content units provided by digital content store 115. For example, digital content distribution system 200 may include content protection routines applying cryptographic techniques for protecting digital content units, such as, routines for creating and storing encryption and decryption keys and routines for encrypting and decrypting digital content units. As understood by one of ordinary skill in the art, digital content distribution system 200 may also include additional software routines and associated hardware for managing digital content, including routines for communicating with user devices routines for displaying and playing digital content to users, and so on.

Users accessing digital content units provided by digital content distribution system 200 may do so with a digital content user system 205 associated with, placed on, or incorporated into user device 210. For example, users accessing the iTunes Music Store may do so with the use of iTunes client software residing in their user devices. As yet another alternative appropriately configured digital content players may put the digital content under system 205, as in the case of Comcast's Rhapsody program. The digital content user system may be implemented as either hardware or software. Digital content user system 205 may include software routines and associated hardware, e.g., a client, for receiving digital content units from digital content store 115 and enabling its users to access and enjoy the digital content represented in the digital content units. For example, digital content user system 205 may include communication routines for transmitting and receiving information to and from digital content distribution system 200, routines for displaying and playing digital content to users, and routines for organizing digital content units stored in user device 210. Digital content user system 205 may also include content protection routines applying cryptographic techniques for protecting digital content units, such as routines for creating and storing encryption and decryption keys and routines for encrypting and decrypting digital content units, for example, routines for decrypting encrypted digital content units requested and obtained from digital content store 115 by a user of user device 210. Digital content user system 205 may also include additional software routines and associated hardware for managing digital content units.

Digital content store 115 and user device 210 may communicate with each other via content distribution network 120. In particular, digital content distribution system 200 in digital content store 115 may transmit and/or receive digital content unit information to and from digital content user system 205 in user device 210. The digital content unit information may include encrypted digital content units, user information such as user personal and billing information for processing a purchase or acquisition of a digital content unit, as well as information necessary for execution of content protection routines implemented in digital content distribution system 200 and/or digital content user system 205, including encrypt keys, decrypt keys, header information associated with an encrypted digital content unit, hash values, and so forth.

It should be understood by one of ordinary skill in the art that when a user of user device 210 requests a digital content unit from digital content store 115, digital content store 115 typically executes one or more content protection routines to protect the digital content unit. Accordingly, when a user of user device 210 requests, purchases and/or downloads a digital content unit from digital content store 115, digital content distribution system 200 may forward an encrypted digital content unit to digital content user system 205 for digital content user system 205 to decrypt and make the content represented in the digital content unit available for the user to enjoy.

As described hereinabove, digital content user system 205 may include trusted or untrusted software, e.g., a trusted or untrusted client software associated with digital content distribution system 200. A trusted software may be any software that operates as expected within its design and policy and is intended for authorized and trusted users only. A trusted user may be a user authorized to use the trusted software and who does not and is not able to make unauthorized use of the software, make unauthorized attempts to break into the trusted software or offer it illegally to other untrusted users. Alternatively, an untrusted software may not guarantee that it is fully protected against unauthorized use, distribution, break-ins and other unauthorized actions by its users.

Trusted Systems

Figure 3:
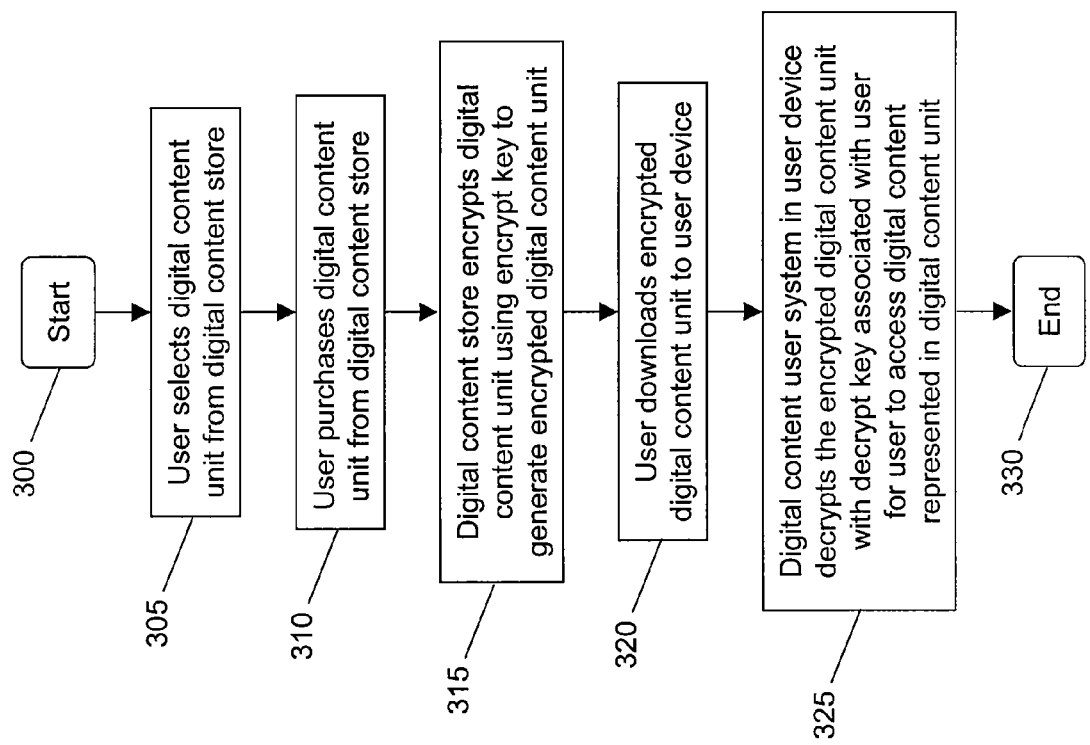
FIG. 3 is a flowchart of an exemplary embodiment of a method according to the present invention for providing an encrypted digital content unit to a trusted digital content user system.

Referring now to FIG. 3, a flow chart of an exemplary embodiment of a method according to the present invention for providing an encrypted digital content unit to a user of a user device having a trusted digital content user system is described. A user of user device 210 having a trusted digital content user system, e.g., digital content user system 205 may select a digital content unit from digital content store 115 at operation 305. This selection operation may, for example, involve the user browsing a selection of digital content units at a web site associated with digital content store 115. The user may be able to view and/or listen to a sample of the digital content unit before selecting the digital content unit for purchase and/or download. Upon making a selection, the user proceeds to purchase and/or obtain the digital content unit from digital content store 115 at operation 310. The purchasing operation may, for example, include the creation of a user account and the transmission of user personal and billing information to digital content store 115 to complete the acquisition.

When the acquisition is finalized, digital content store 115 applies content protection routines to the selected digital content unit before sending it to the user. For example, at operation 315, digital content store 115 may encrypt the selected digital content unit using an encrypt key to generate an encrypted digital content unit for transmission to the user. In one exemplary embodiment, the encrypt key may be associated with the user, e.g., it may be a part of a secret key technique in which the encrypt key is secret and only known to the user and digital content store 115. In this secret key technique, the encrypt key is associated with a decrypt key that is also secret and only known to the user and digital content store 115. The encrypt key and the decrypt key may be the same key under this technique. In another exemplary embodiment, the encrypt key may be associated with the digital content store, e.g., it be a part of a public key technique, with the caveat that the encrypt key may be a secret key known only to digital content store 115. In this case, the same encrypt key may be used to encrypt all digital content units regardless of the user while a decrypt key unique to each user may be used to decrypt the encrypted digital content units. Alternatively, the encrypt key may be a key associated with the digital content unit.

The user downloads the encrypted digital content unit to user device 210 at operation 320. Digital content user system 205 in user device 210 then decrypts the encrypted digital content unit with the decrypt key associated with the user at operation 325. After decryption of the digital content unit, the user may access the digital content represented in the digital content unit, for example, the user may view or listen to the digital content therein.

Untrusted Systems

Figure 4:
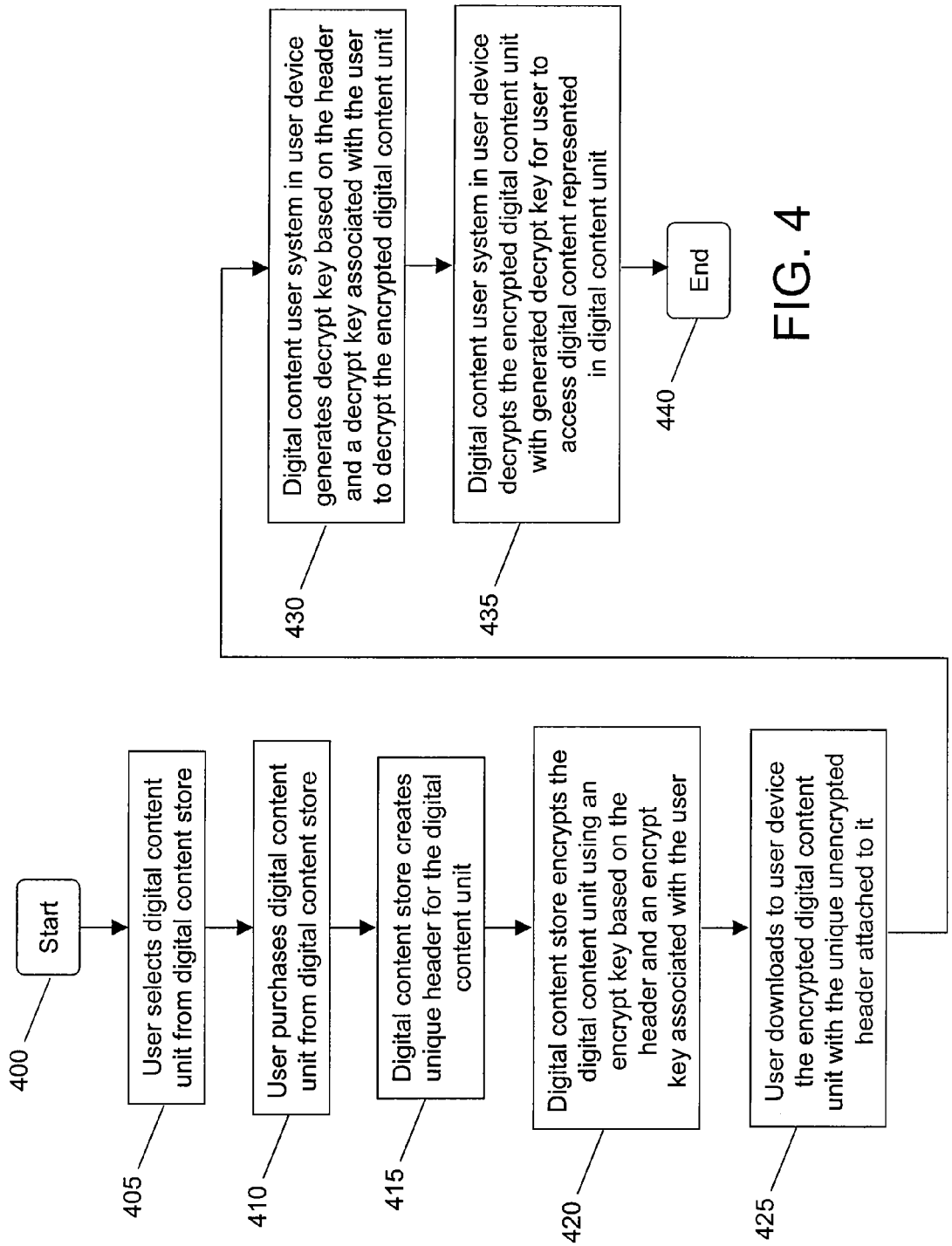
FIG. 4 is a flowchart of an exemplary embodiment of a method according to the present invention for providing an encrypted digital content unit to an untrusted digital content user system.

Referring now to FIG. 4, a flow chart of an exemplary embodiment of a method according to the present invention for providing an encrypted digital content unit to a user of a user device having an untrusted digital content user system is described. A user of user device 210 having an untrusted digital content user system, e.g., digital content user system 205, selects a digital content unit from digital content store 115 at operation 405. This selection operation may, for example, involve the user browsing a selection of digital content units at a web site associated with digital content store 115. The user may be able to view and/or listen to a sample of the digital content unit before selecting the digital content unit for purchase and/or download. Upon making a selection, the user proceeds to legitimately acquire the digital content unit from digital content store 115 at operation 410. The purchasing operation may, for example, include the creation of a user account and the transmission of user personal and billing information to digital content store 115 to complete the acquisition.

When the legitimate acquisition is finalized, digital content store 115 applies content protection routines to the selected digital content unit before sending it to the user. For example, at operation 415, digital content store 115 creates a unique header for the selected digital content unit. With an untrusted digital content user system, a unique header is created for each digital content unit in digital content store 115 prior to be being sent to a user. Next, at operation 420, digital content store 115 creates an encrypt key based on the header and on an encrypt key associated with the user to encrypt the selected digital content unit. This encrypt key may be, for example, a cryptographic hash of the header and the encrypt key associated with the user. Because the header is unique to the digital content unit, each digital content unit has a unique encrypt key associated with it, regardless of the user.

After encryption of the selected digital content unit with the unique encrypt key, the user may download the encrypted digital content unit to user device 210 at operation 425. The encrypted digital content unit has the unencrypted unique header attached to it so that digital content user system 205 in user device 210 may be able to, at operation 430, generate a decrypt key to decrypt the encrypted digital content unit based on the unique header and the decrypt key associated with the user. Alternatively, digital content user system 205 may provide the unencrypted header to digital content store 115 so that digital content distribution system 200 in digital content store 115 may generate the decrypt key and provided it to digital content user system 205. Digital content user system 205 may also retrieve the decrypt key from digital content store 115 after the key is generated by digital content distribution system 200 in digital content store. In the example above, the decrypt key may be a cryptographic hash of the header and the decrypt key associated with the user. The encrypted digital content unit is decrypted with the generated decrypt key at operation 435.

As understood by those of ordinary skilled in the art, the encrypt key and the decrypt key that are associated with the user may be the same key in a secret key technique. In this case. the cryptographic hash of the unique header and the encrypt key may be the same as the cryptographic hash of the unique header and the decrypt key.

For embodiments employing either a trusted digital content user system or an untrusted digital content user system (FIG. 4), the present invention enables a user to obtain one or more rights in a legitimate copy of a digital content unit without having to download the digital content unit. In accordance with the principles and embodiments of the present invention, a user having access to a copy of an encrypted digital content unit may be able to obtain a legal right to access the content therein without having to download another copy of the digital content unit from, for example, a digital content store.

For example, the digital content store may offer the user having access to a copy of an encrypted digital content unit the right to legitimize that copy. The copy may be obtained through any of a number of mechanisms, such as by transmission across a network, copying from another entity, obtaining a storage medium on which the digital content unit (or copy) resides, and so forth. The users may obtain such a right from the digital content store. The right may be obtained for a fee, for other consideration, or for free. (This applies equally to the foregoing description and examples.) As one example, the fee may be a fraction of the fee used to download a digital content unit. Alternatively, the right to access or legitimately have a right in the copy of the digital content unit may be granted for free. The copy of the encrypted digital content unit to which the user has access was originally encrypted and authorized solely for the user who obtained and/or downloaded it from the digital content store, the user may, in effect, when purchasing the right to access the digital content therein, obtain the right to decrypt the copy for his/her own use. This way, if Alice (for example) purchases an encrypted digital content unit (an "original unit") from the digital content store and Bob copies to Alice's encrypted digital content unit (a "copy unit"), Bob may be able to obtain from the digital content store the legal right to access the digital content in the copy unit. Bob may be access the copy unit for his enjoyment even though the copy was encrypted with Alice's key. Thus, Bob may access the digital content in the copy unit without having to download another copy from the digital content store.

Decoupling Downloading and Authorization

Figure 5:
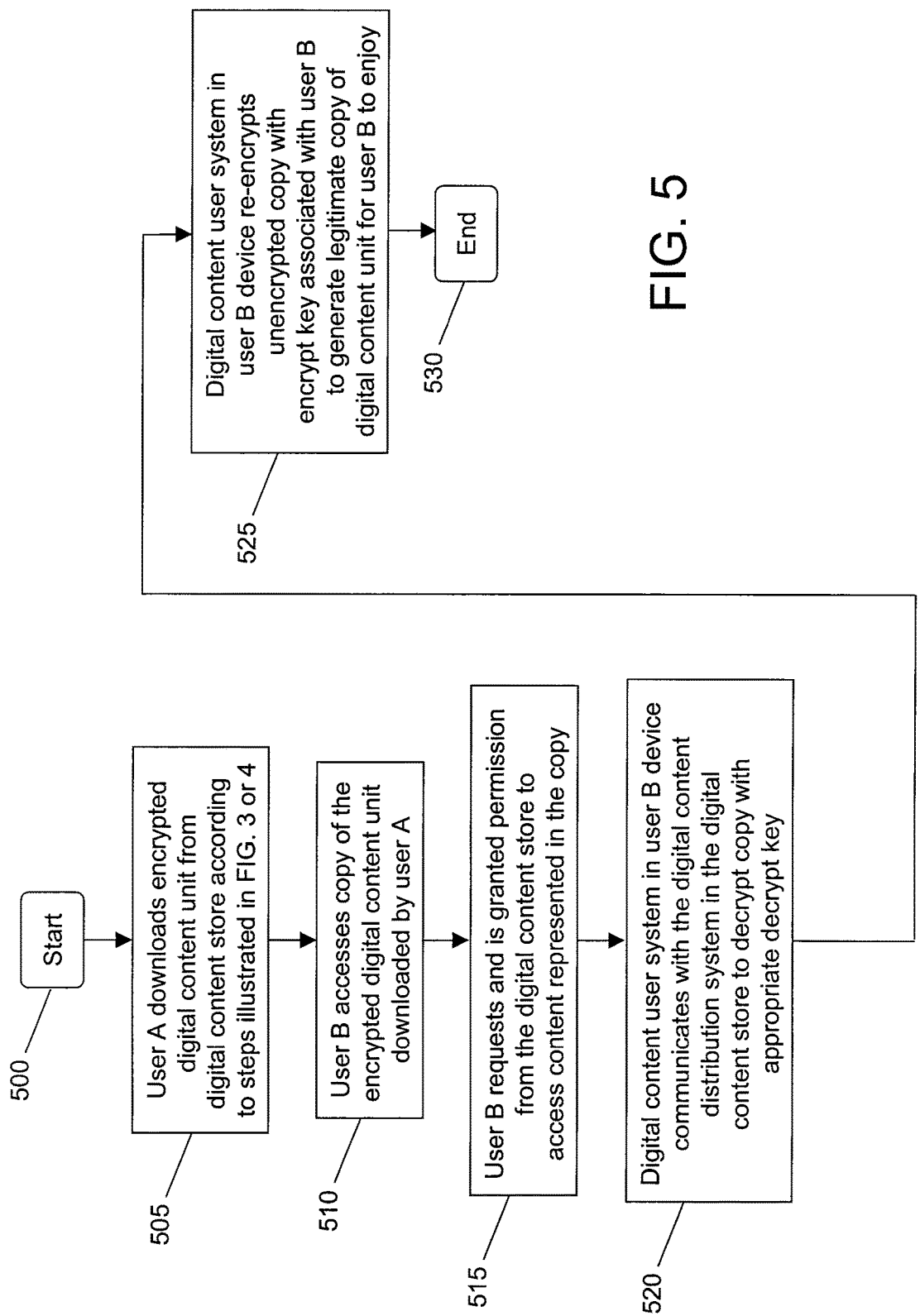
FIG. 5 is a flowchart of an exemplary embodiment for providing one or more rights in a legitimate copy of a digital content unit to a user without the user having to download the digital content unit from a digital content store.

Referring now to FIG. 5, a flowchart of an exemplary method for authorizing or legitimizing a copy of a digital content unit (for example, a copy unit) without downloading the digital content unit from a digital content store is shown. At optional operation 505, user A, may download an encrypted digital content unit from digital content store 115 to her user device. The digital content unit may be encrypted according to whether the digital content user system in user A's device is trusted (FIG. 3) or untrusted (FIG. 4), or in another manner entirely. For example. the digital content unit may be encrypted with the "Freeplay" encryption routine previously discussed.

Regardless of how the digital content unit may have been encrypted, a copy of the encrypted digital content unit may be provided to, or otherwise accessed by, user B, at operation 510. For example, user A may provide user B a copy of the encrypted digital content unit or user B may get the encrypted digital content unit through other means. Regardless of how user B obtains the copy unit of the encrypted digital content unit downloaded by user A, user B may not be able to access the content therein because the copy is encrypted to be accessed only by user A. As an example, all or part of the copy unit may be encrypted with a private key corresponding to (and accessible only by) user A. Thus, user B may not be able to legally access the content in the copy unit unless user B is granted access to the appropriate key for decrypting the copy or the copy unit is re-encrypted.

Accordingly, certain embodiments of the present invention enable user B to obtain authorization from digital content store 115 to access the content in the copy at operation 515. Digital content store 115 may, for example, sell the right to access the copy to user B on a per unit fee, as part of a subscription, or in exchange for other valuable services or consideration. (As a single example, digital content store 115 may also provide the right to access the copy to user B for free, for example as an incentive for user B to sign up to other services offered by digital content store 115. As yet another example, the store 115 may provide free authorization, legitimization, or authentication of B's copy unit for a finite period of time.)

As described above, user B may access the content in the copy by first decrypting the copy with the appropriate key. Thus, at operation 520, the digital content user system in user B's device, e.g., digital content user system 205, communicates with digital content distribution system 200 in digital content store 115 to find the appropriate decrypt key to decrypt the copy.

In the case of a trusted digital content user system, the appropriate decrypt key to decrypt the copy may be, for example, a key associated with another user, i.e., the user who downloaded the original unit of the encrypted digital content unit from digital content store 115. Because this decrypt key is typically accessible by the digital content store 115, the trusted digital content user system in user B's device may communicate with digital content distribution system 200 to retrieve the decrypt key from digital content store 115. Alternatively, digital content distribution system 200 may provide the decrypt key to the trusted digital content user system in user B's device.

As yet another alternative, the digital content store 115 may maintain control of the other user's decrypt key. In this alternative embodiment, the decrypt key is not passed from the digital content store to user B's device. Instead, at least the encrypted header of the copy unit is transmitted from user B's device to the digital content store. The digital content store may then employ user A's key to decrypt the header.

That is, the appropriate decrypt key to decrypt the copy may be, for example, a key based on (or contained in) the unique header attached to the encrypted digital content unit (and to the copy thereof) and a key associated with user A, i.e., the user who downloaded the encrypted digital content unit from digital content store 115. Again, because user A's decrypt key is accessible by the digital content store 115, user B's digital content user system may, for example, communicate with digital content distribution system 200 (or directly to the store) to provide digital content distribution system 200 (or the store) with the encrypted header so that digital content distribution system 200 may verify that the header indeed corresponds to the encrypted digital content unit downloaded by user A. This may be done, for example, by employing user A's key to decrypt the header or by comparing the encrypted header to a record of digital content units in which user A has a right in order to determine whether the encrypted header matches a digital content unit in user A's possession.

Based on the header, digital content distribution system 200 may retrieve the decrypt key from the header by employing user A's key. For example, the decrypt key may be a cryptographic hash of the header and the decrypt key associated with user A. The digital content user system in user B's device may then retrieve the decrypt key from digital content store 115. Alternatively, digital content distribution system 200 may provide the decrypt key to the digital content user system in user B's device. As yet another alternative, the digital content store 115 or distribution system 200 may re-encrypt the header with user B's key and return an encrypted header, thus preventing user B or any device associated with him from ever obtaining user A's key.

After obtaining the appropriate decrypt key to decrypt the copy, the digital content user system in user B's device may decrypt the copy unit, and at operation 525, re-encrypt it with an encrypt key associated with user B to generate a legitimate copy of the digital content unit for user B to enjoy. Alternatively, operation 525 may be performed by the digital content store 115 or digital content distribution system 200. In such embodiments, the entire copy unit may be transmitted to the store or system, or simply the header of the copy unit may be so transmitted.

As described hereinabove, one of ordinary skill in the art should understand that the legitimate copy may be generated without user B having to download the digital content unit from digital content store 115. It should also be understood by one skilled in the art that the present invention may be used in any application requiring a way to transform an encrypted digital content unit that is encrypted with a key intended for a user, system, or device A into another encrypted digital content unit that is encrypted with a key intended for a user, system, or device B.

Transcryption

As yet another option, the digital content store 115 may transcrypt the copy unit to produce a legitimized or authorized copy of the digital content unit. Since the digital content store 115 stores and has access to both user A's decryption key and user B's decryption key, the store may employ both keys to generate a method or routine for converting a header (or digital content unit) encrypted with user A's key into a header (or digital content unit) encrypted with user B's key. This is commonly called "transcryption."

Transcryption may be illustrated by a simple example. Suppose that user A and user B both have relatively simple keys: user A adds five to the value of every encrypted bit to obtain decrypted data, while user B adds three to the value to every encrypted bit to decrypt. Since the digital content store 115 may access both keys, it may compare the two in order to determine a relationship between the keys. In the present example, instead of decrypting the digital content unit with user A's key and re-encrypting it with user B's key, the digital content store 115 (or distribution system 200) may simply subtract two from the value of each bit encrypted with user A's key. This would result in a digital content unit that, when decrypted with user B's key, provides the same data obtained by user A prior to the transcryption.

By employing both user A's key and user B's key to determine the operations necessary to change the data encrypted with user A's key into data that may be decrypted with user B's key, the exemplary embodiment may avoid performing two operations when one may suffice. Thus, transcryption may take the place of decryption of a digital content unit (such as a copy unit) with user A's key and re-encryption with user B's key. This, in turn, may reduce the time, processing power, hardware requirements, bandwidth for transmissions, and so forth associated with various embodiments of the present invention. The implementation of such transcryption includes not only transcryption routines known now, but those hereafter discovered or created.

Watermarks

In addition, one or more digital watermarks may be employed by various embodiments of the present invention. A digital watermark (or simply "watermark") may take the form of one or more bits or bytes stored in a digital content unit. Typically, although not necessarily, the watermark is included in the header of the digital content unit. In alternative embodiments, the watermark may be included in the data of the digital content unit.

The watermark(s) may serve to establish a chain of ownership or authorization. Each time a user authorizes or legitimizes a version of a digital content unit, the watermark (s) may record the transaction. Thus, the watermark may effectively recount the history of a digital content unit and permit the digital content store 115, distribution system 200, or another entity to trace the users from which the digital content unit in question was obtained.

According to one exemplary embodiment of the present invention, a first watermark may be added to a digital content unit when the unit is initially obtained from the digital content store 115. The first watermark contains information identifying the user who initially obtained the digital content unit ("user 1"). User 1 may pass a copy of the digital content unit to user 2, who may then employ one of the methods, systems, and/or apparatuses described elsewhere herein to authorize his copy unit.

When user 2 authorizes his copy unit, a second watermark may be added to the copy unit. (The copy unit contains the first watermark since it is a copy of the original unit.) The second watermark contains information identifying user 2. If user 3 obtains a copy unit from user 2 and subsequently authorizes this second copy unit (i.e., the copy of the copy), a third watermark identifying user 3 may be added. This may continue indefinitely.

In alternative embodiments, a single watermark may be employed, as may a fixed maximum of watermarks. The single watermark (or one or more of the fixed maximum) may be updated each time a copy unit is authorized and thus contain the history of the copy unit/digital content unit.

Alternatively, the historical information may be stored at the digital content store 115 or distribution system 200 as records in a database, and each watermark may simply serve as a pointer to a record in the database.

By adding watermarks to digital content units, certain enhancements to the various embodiments discussed herein may be possible. For example, a digital content store 115 may be set up to provide free authorization of a copy unit (or a free download of an original unit) or other remuneration to a user who widely distributes copies of a particular digital content unit. This may be desirable, for example, where the digital content unit is a form of marketing such as a free audio track of a band, a commercial, a form of "viral marketing," and so forth. The digital content store 115 may count the number of copy units having a watermark attributable to a particular user and provide the free authorization or download when the count exceeds a minimum.

As yet another enhancement, a user may receive a payment for each copy unit authorized that includes a watermark identifying the user. As a single, non-limiting example, the user may receive a fraction of the authorization fee charged by the digital content store 115 for authorizing the copy unit to another user. The user may receive such payment for any copy unit that is authorized and has a watermark identifying the user. Alternatively, the user may receive payment only if the watermark indicates the user was within a certain number of steps away from the copy unit being authorized. For example, a user may receive payment only where his watermark is the last or next-to-last watermark in the copy unit being authorized. As yet another example, the user may receive diminishing payments the further back in the history chain his watermark is.

Still another embodiment may refuse to authorize a copy unit if the number of copy units having a specific watermark exceeds a threshold. For example, a digital content store 115 may only authorize one hundred copies of a digital content unit having a particular watermark therein.

Multiple Random Keys

It should be noted that certain methods and embodiments described above, when used in a system having both a user-linked or -associated key and a random key (such as the Fairplay system) may employ a single random key that persists across both an original unit and all copy units. That is, when certain embodiments described above operate in a system like Fairplay, they generally decrypt the header with user A's key and re-encrypt it with user B's key. The random key associated with the original unit and stored in the header may not change.

In alternative embodiments of the present invention, the random key associated with the digital content unit- as opposed to a user key- may also be changed. The digital content store 115, distribution system 200, or user device may generate a second random key during, before or after decrypting the header/digital content unit with user A's key, re-encrypting the header/digital content unit with user B's key, or transcryption. The second random key may be employed to encrypt the data in the digital content unit and may be stored in the header prior tQ encryption of the header with user B's key (or transcryption of the header). This may add an additional layer of security to digital content units Fee Structures By decoupling the authorization of a digital content unit from the download of a digital content unit, bandwidth and/or transmission charges may be reduced for the digital content store 115. In this manner, the operator of the digital content store may reduce the operating expenses of the store while maintaining revenue streams.

This reduction in operating expenses may facilitate a two-tier pricing structure. For example, the digital content store 115 may charge a first price to users who download a digital content unit from the store and a second price to users who authorize a digital content unit without downloading the unit. Thus, to continue the example, some portion of the cost savings to the digital content store 115 may be passed along to a user authorizing a copy unit.

As a more specific example, the digital content store 115 may charge $1 for a user to download an authorized copy of a digital content unit. The same store 115 may charge 50 cents to authorize a copy unit without downloading the entire digital content unit from the store. This may encourage users to trade or copy digital content units as well as authorize these copies. Such sharing may, in turn, reduce piracy or illegal copying since the opportunity cost of having one or more rights in an authorized copy of the digital content unit may be reduced.

Partial Authorization and Additional Authorization Strategies

Certain embodiments of the present invention may contain yet further features. For example, a user may have multiple choices in how to authorize a given digital content unit. A user may pay a first fee to completely authorize a digital content unit or a second, and presumably lesser, fee to only partially authorize a digital content unit. Presumably, although not necessarily, the digital content unit being authorized is a copy unit.

Partial authorization of a copy unit may come in many forms. A user may authorize a copy only for a particular right or rights. A user may authorize a digital content unit for a set time period. A user may authorize a digital content unit for an unlimited time, but foregoing the right to make any copies of the unit. A user may authorize a digital content unit to be replayed only in a particular medium or at certain times. All of these authorizations are examples of partial authorization. Additionally, alternative embodiments of the invention may permit a user to partially authorize a digital content unit and later add additional partial authorization to that same digital content unit. For example, a user may authorize a digital content unit for a set period of time, then later authorize the same digital content unit for additional time. Alternatively, the user may authorize a digital content unit for playback or presentation, and later authorize that same unit for distribution. A watermark may likewise be updated or additionally provided each time a partial authorization is obtained.

Figure 6:
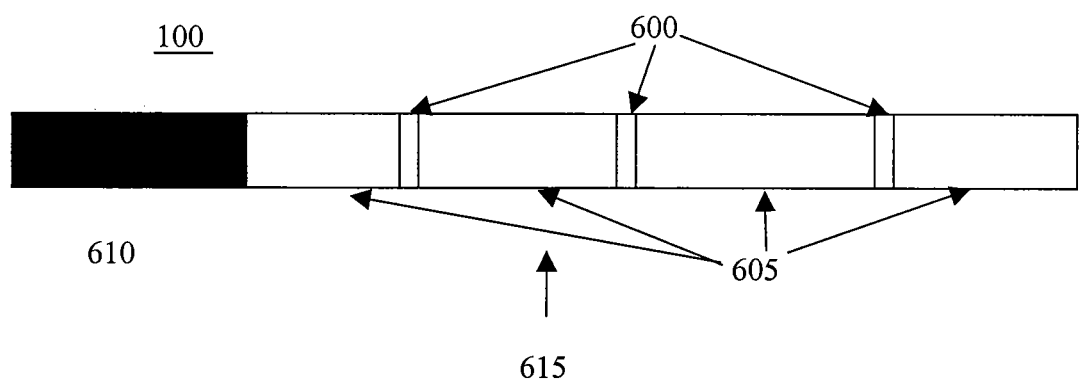
FIG. 6 generally depicts a digital content unit 100 as a number of blocks or granular file storage elements.

Additional aspects and embodiments of the invention may include further methods of separating rights in a digital content unit from the unit itself and/or digital content units enhanced in a variety of manners. For example, a digital content unit might include a series of markers embedded at various points in the unit. The markers may function in a manner similar to a table of contents or chapter list. The digital content unit may be segmented by the markers, as shown in FIG. 6. FIG. 6 generally depicts a digital content unit 100 as a number of blocks or granular file storage elements (such as kilobits). A certain number of blocks of the digital content unit 100 make up the aforementioned header 610. The remainder of the digital content unit 100 may be thought of as media or content 615 and markers 600. One or more markers 600 may be embedded at certain points throughout the content 615. Each marker 600 denotes either the beginning or ending of a digital segment 605. The plurality of digital segments 605 together make up the exemplary digital content unit 100. It should be noted that, although FIG. 6 depicts the markers 600 embedded in the media 615 of the digital content unit, the markers may instead take the form of a list encoded or placed in the header. In such a configuration, each marker indicates a play time or file length within the media instead of being embedded in the media. Accordingly, as used herein, the term "marker" is intended to cover both embodiments, as well as other configurations of pointers, flags, lists and so forth.

Digital rights management may be applied individually to each digital segment 605, such that a single segment 605 may be authorized without authorizing any other segment. Optionally, certain segments may be freely available (i.e, pre-authorized or not requiring authorization). Further, and as described elsewhere herein, one or more segments 605 may be authorized only for a particular time.

Generally, permitting authorization of specific segments 605 of a digital content unit 100 may allow reduced authorization costs when compared to authorization of a full digital content unit, permit greater freedom of choice with respect to what is authorized and create additional interest in the authorization of legitimate digital content units.

It should be noted that the concept of embedding one or more markers 600 in a digital content unit 100 may be used in a variety of ways beyond simply permitting authorization of individual segments 605 of a digital content unit. For example, presume a digital content unit 100 is made of a television show, movie, song, video, or other media (collectively, "content") and one or more advertisements. Each advertisement may be placed within the content, such that the content is periodically interrupted by an advertisement in a manner similar to a broadcast television show. A first marker 600 may point to the beginning of an advertisement embedded in the content and a second marker to the end of the advertisement. Each such advertisement may be bounded by markers in this manner.

A digital content unit 100 with such embedded markers 600 may be freely released or acquired in a fashion, format, or authorization mode that permits viewing of the entire unit, including advertisements. However, upon authorization of the digital content unit 100, the user may gain the ability to detect and/or skip playback of the unit to a desired marker. Such functionality may be unlocked in the authorized unit 100 and recognized by an appropriate media player, such as the ITUNES media player or WINDOWS media player. Thus, although the digital content unit 100 may be freely distributed and viewed without authorization, authorization of the unit 100 may permit the skipping of advertisements or other elements embedded in the content. In this manner, the user may choose to view the entire digital content unit 100, including advertisements, or authorize the unit to enjoy an advertisement-free experience.

It should be noted that the segments 605 bounded by markers 600 need not be advertisements. They may be, for example, certain segments of content deemed less relevant or interesting by an author creating the digital content unit 100. As an example, if the content is a sporting event, the markers 600 may point to the beginning and end of each play, performance, and so forth, so that only the performance of athletes during the sporting event is viewed. To continue this example, presume the digital content unit 100 includes a football game. A marker 600 may point to each moment the football is snapped (or a time shortly before the snap); another marker may point to the moment where a player is downed or the play ends (or, again, a time shortly thereafter). Markers to the beginning of a play may be termed a "start marker" and markers to the end of a play termed a "stop marker." A media player may be configured to automatically jump from a stop marker to the next start marker, skipping each segment 605 in between. Alternatively, the media player may skip when commanded by a user or prompt a user to initiate the skip. Regardless, by skipping between embedded markers 605 in this manner, the user may view only the actual plays of the football game, thus permitting the user to view all the action of the game in a shortened timeframe. Similar marker schemes may be used in other sporting events, such as baseball, hockey and so forth, in movies, television shows, audio programs, songs, podcasts and so forth. Once the digital content unit 100 is authorized, the ability to skip between markers in this manner may be enabled.

Effectively, in the exemplary digital content units 100 described above, authorizing the digital content unit permits access to, and use of, one or more markers embedded in the unit.

Yet another embodiment of a digital content unit 100 may include multiple versions of media. For example, a digital content unit 100 may contain a first audio or video clip or program of a first quality and a second audio or video clip or program of a second, higher quality. Continuing the example, the digital content unit 100 may store the first program as a first segment 605 and the second program as a second segment. It should be noted that the first and second programs may be the same content (for example, the same television program, song, movie, and so forth) but of differing qualities. In the present example, the first segment may be a low-bitrate encoding of the content and the second segment may be a high-bitrate (and thus typically high quality) encoding of the content. Thus, the single digital content unit 100 has two versions of the same media stored within it, one low-quality and one high-quality.

As used herein, "quality" generally refers to the reproduction fidelity of the media. Thus, a low-quality segment or media may be lack information or data (such as video or audio resolution) that may be contained in a high-quality version of that segment or media. As a non-limiting example, a song or audio clip digitized as a MPEG-1 Audio Layer-3 ("mp3") file at 44 kilobits per second is generally of a lower quality than that same song or audio clip digitized as a mp3 file at 192 kilobits per second, because the former version has less audio information than the latter.

Prior to authorization, a user may be able to access the low-quality media of the digital content unit 100. After authorization, the high-quality media of the digital content unit may be unlocked and/or accessible to the user. The digital content store 115, or other authorization mechanism, may either authorize the digital content unit such that the high-quality media replaces the low-quality media (for example, by deleting the low-quality version or overwriting the low-quality version with the high-quality version) or by making both versions accessible to the user.

In another embodiment, which is generally compatible with any and all alternative embodiments described elsewhere herein, the software or hardware responsible for playing or presenting the digital content unit 100, such as the aforementioned media player, may forcibly down-convert the bitrate of an unauthorized digital content unit or otherwise degrade the quality of the digital content unit. The software or hardware ("replay mechanism") may, for example, determine that the digital content unit has not been authorized in any manner described herein or known to those skilled in the art. Upon such a determination, the replay mechanism cap the playback bitrate, display size, audio quality and/or video quality of the digital content unit. Thus, continuing the example, the replay mechanism may play an mp3 file encoded at 192 kilobits per second at a maximum rate of 48 kilobits per second or any other desired rate if the mp3 file is unauthorized. This is referred to as "downconverting" the digital content unit. Downconversion of a digital content unit may be useful in that it does not require the digital content unit to contain both a high-resolution and low-resolution version of content or media. Accordingly, an embodiment operative to downconvert a digital content unit until the unit is authorized may serve as an alternative to an embodiment accessing multiple versions of content in a digital content unit. As yet another example, the resolution of a video clip in a digital content unit 100 may be capped at a maximum resolution until the digital content unit is authorized. As still a further example, the maximum size at which a digital content unit may be played or viewed may also be capped until the digital content unit is authorized. That is, regardless of the resolution of the content of the digital content unit, the display size may be capped until the unit is authorized.

As a refinement of the general examples discussed above, a digital content unit 100 may include content corresponding to a television show or movie. The replay mechanism may play the digital content unit at a first resolution if unauthorized, such as 400 lines of resolution (i.e., normal television resolution). However, the replay mechanism may play the digital content unit at a second, higher resolution if the unit is authorized, such as any high-definition television resolution including 780p or 1080i. Accordingly, a user may receive a copy of a digital content unit that is unauthorized but may be replayed at standard television resolution. Upon authorization, the user may view the digital content unit at a high-definition resolution. Thus, authorizing the digital content unit 100 unlocks a superior version of the digital content.

Essentially, such an embodiment may vary the accessible quality of the digital content unit 100 based on the authorization of the unit.

Still another exemplary embodiment of a digital content unit 100 may be partially accessible if unauthorized and fully accessible if authorized. As one example, a user receiving a copy of a digital content unit 100 from any source, including the digital content store 115, another user, a digital content distribution system 200, and so forth, may access a limited portion of the digital content unit (i.e., a "preview"). Continuing the example, the user may be able to access a certain portion or segment of the digital content unit, such as thirty seconds or a minute of the unit. This portion of the digital content unit may be predetermined, such that every user receiving an unauthorized digital content unit may access the same portion, or may be user-chosen, so that each user may choose the thirty seconds, minute, or other time-bounded portion of the unit that may be accessed. In this way, a user receiving an unauthorized digital content unit may enjoy a preview of the fully-authorized digital content unit. Further, in at least one exemplary embodiment the user may choose the preview that is accessible.

Certain embodiments of the present invention may operate within particular time boundaries. For example, the value of certain media may decrease or increase over time. News reports are generally less valuable the older they are while out-of-print or hard to find movies may become more valuable as time passes. Accordingly, in certain embodiments of the invention, the cost to authorize a digital content unit 100 may vary with the media stored in the unit (or type of unit) and also with the passage of time. A digital content unit 100 may, for example, require authorization to be accessed before a particular time has passed. After the passage of the specified time, the digital content unit may automatically authorize or no longer require authorization. A creation timestamp may be included in the digital content unit to set the initial date of the unit in order to determine when, if ever, the digital content unit automatically authorizes or no longer requires authorization. Further, a second timestamp may specify the date or time of automatic authorization or the date/time at which authorization is no longer required to play the entire unit, the replay mechanism, digital content store 115, or other device may be configured to recognize such timestamps and, if necessary, create or modify them. Alternative embodiments may associate any right with the authorization of the digital content unit in this manner.

It should be noted that certain embodiments may employ the converse case of the above, where a digital content unit 100 is initially fully authorized or does not require authorization. However, after a particular time passes, the digital content unit 100 may require authorization to be played either in full or in part. Yet other embodiments may combine elements of these two embodiments, such that a digital content unit 100 is initially authorized and later requires re-authorization so that the user may continue to enjoy rights to all or part of the digital content unit 100. Essentially, in such an embodiment the rights associated with authorizing the digital content unit 100 may terminate after a time and require re-authorization to generate additional revenue, or even a revenue stream for the author of the digital content unit or operator of the digital content store or other authorization service.

Time-bounded authorization of a digital content unit 100 may be implemented by configuring a replay mechanism, digital content store 115, or authorization software to invalidate or delete an authorization key for the digital content unit after a particular time passes. The time after which the authorization is invalidated may be specified in or by the digital content unit 100, replay mechanism, digital content store 115, and/or other authorization software. By implementing such a deauthorization scheme, embodiments of the present invention may permit temporary authorization of a digital content file. The authorization and/or rights granted by such authorization may be purchased for a lesser amount of time, money or goods than full or non-time-bounded authorization in certain embodiments.

Implementing a deauthorization scheme may also permit deauthorization of a digital content unit 100 after a certain number of plays, rather than after a period of time passes. For example, an initially-authorized digital content unit 100 might permit the unit to be played five times, after which the unit may require reauthorization. Such a scheme permits a user to obtain rights in playing or accessing the digital content unit for a desired number of times rather than permanently, thus providing more authorization flexibility. Deauthorization of a digital content unit may be prompted by a flag, key or timer stored in the digital content unit itself, authorization mechanism, replay mechanism, or via a separate element altogether.

Additionally, certain embodiments of the present invention may permit access to rights in a digital content unit 100 only at particular times of day. For example, a user may desire to view a particular digital content unit 100 only after 7 p.m. and only until 11 p.m. The digital content unit 100 may include a field containing information regarding when the unit may be accessed. Alternatively, the replay mechanism, digital content store 115, and so forth may be configured to store such time-dependent information in this manner, the digital content unit 100 (or appropriate software or hardware) may mimic a form of parental control, permitting access to the unit only when appropriate.

Still another embodiment of a digital content unit 100 may be authorized in such a manner that corresponding rights may be accessed a limited number of times within a specific timeframe. For example, an mp3 file or video file may be authorized to be played only twice a week. The exact number of times the rights may be accessed, as well as the specific timeframe, may vary from embodiment to embodiment. Such a limitation may be implemented as a flag, key or timer within the digital content unit, authorization mechanism and/or replay mechanism.

In yet another embodiment of the present invention, authorization of multiple digital content units 100 may automatically authorize other digital content units 100. For example, authorization of a certain number of mp3 files corresponding to tracks of an album may automatically authorize the remaining mp3 files corresponding to tracks of that album. Similarly, in certain embodiments the authorization of a minimum number of rights with respect to a digital content unit 100 may automatically authorize (or at least permit authorization) additional rights in the digital content unit. As an example, authorizing the rights to play and reproduce the digital content unit 100 may automatically authorize the right to make a derivative work of the digital content unit or incorporate the digital content unit into another work.

For any or all of the foregoing embodiments employing limited authorization (specifically including time-limited or quality-limited authorizations), full authorization may be requested or granted to the user after the limited authorization expires.

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Operations of the described processes may be reordered or combined, and other operations may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents.

We claim:

1. For a first electronic device, a method for providing access to digital content, the method comprising:
    receiving a piece of content from a second electronic device, wherein the received piece of content comprises a first portion selected as a preview of the piece of content by a user of the second electronic device, wherein the first and second electronic devices are user devices;
    identifying the piece of content as content to which the first electronic device does not have access to an entirety of;
    storing, on the first electronic device, the piece of content to which the first electronic device does not have access to the entirety of;
    at the first electronic device, receiving a selection by a user of the first electronic device of a second portion of the piece of content, received from the second electronic device and stored on the first electronic device, as a preview of the piece of content for the first electronic device that is different from the preview of the piece of content selected by the user of the second electronic device;
    at the first electronic device, presenting the second portion of the piece of content, wherein the receiving of the piece of content, identifying, storing, receiving the selection, and presenting are performed by the first electronic device;
    contacting, by the first electronic device, an authorization mechanism; and
    receiving, from the authorization mechanism, authorization for the first electronic device to access the piece of content.

2. The method of claim 1, wherein the piece of content is of a same quality as the second portion of the piece of content.

3. The method of claim 1, wherein identifying the piece of content as content to which the first electronic device does not have access to the entirety of comprises identifying that the first electronic device has partial access to the piece of content, wherein the method further comprises, upon receiving the authorization to access the piece of content, enabling access to the entirety of the piece of content.

4. The method of claim 1, wherein the piece of content comprises at least one pointer not accessible in the second portion of the piece of content.

5. The method of claim 4 further comprising, upon receiving the authorization to access the piece of content, enabling access to the at least one pointer that is not accessible in the second portion of the piece of content.

6. The method of claim 1, wherein the first and second portions of the piece of content are equal-duration time-based subsets of the piece of content starting at different times in a duration of the piece of content.

7. A non-transitory computer readable medium of a first electronic device, the non-transitory computer readable medium storing a program which when executed by at least one processing unit of the first electronic device provides access to digital content, the program comprising sets of instructions for:

receiving a piece of content from a second electronic device, wherein the received piece of content comprises a first portion selected as a preview of the piece of content by a user of the second electronic device, wherein the first and second electronic devices are user devices;

identifying the piece of content as content to which the first electronic device does not have access to an entirety of;

storing, on the first electronic device, the piece of content to which the first electronic device does not have access to an entirety of;

at the first electronic device, receiving a selection by a user of the first electronic device of a second portion of the piece of content, received from the second electronic device and stored on the first electronic device, as a preview of the piece of content for the first electronic device that is different than the preview of the piece of content for the second electronic device;

at the first electronic device, presenting the second portion of the piece of content, wherein the receiving of the piece of content, identifying, storing, receiving the selection, and presenting are performed by the first electronic device;

contacting an authorization mechanism; and receiving, from the authorization mechanism, authorization for the first electronic device to access the piece of content.

8. The non-transitory computer readable medium of claim 7, wherein the set of instructions for identifying the piece of content as content to which the first electronic device does not have access comprises a set of instructions for identifying that the first electronic device has partial access to the piece of content, wherein the program further comprises a set of instructions for enabling access to a remainder of the piece of content that is not yet accessed by the first electronic device upon receiving the authorization to access the piece of content.

9. The non-transitory computer readable medium of claim 8, wherein the second portion of the piece of content is of a same quality as the remainder of the piece of content.

10. The non-transitory computer readable medium of claim 8, wherein the piece of content comprises a pointer that separates the second portion and the remainder of the piece of content.

11. The non-transitory computer readable medium of claim 7, wherein the first and second portions of the piece of content are equal-duration time-based subsets of the piece of content starting at different times in a duration of the piece of content.

12. The non-transitory computer readable medium of claim 7, wherein the program further comprises a set of instructions for deauthorizing the piece of content after a period of time.

13. The non-transitory computer readable medium of claim 12, wherein the set of instructions for deauthorizing comprises a set of instructions for removing a key associated with the piece of content.

14. The non-transitory computer readable medium of claim 8, wherein the program further comprises a set of instructions for deauthorizing the remainder of the piece of content after a period of time.

15. The non-transitory computer readable medium of claim 7, wherein the authorization mechanism comprises at least one of a digital content store and a playback mechanism.

16. A first electronic device comprising:

a set of processing units; and a non-transitory computer readable medium storing a program which when executed by at least one of the processing units provides access to digital content, the program comprising sets of instructions for:

receiving a piece of content from a second electronic device, wherein the received piece of content comprises a first portion selected as a preview of the piece of content by a user of the second electronic device, wherein the first and second electronic devices are user devices;

identifying the piece of content as content to which the first electronic device does not have access to an entirety of;

storing, on the first electronic device, the piece of content to which the first electronic device does not have access to the entirety of;

at the first electronic device, receiving a selection by a user of the first electronic device of a second portion of the piece of content, received from the second electronic device and stored on the first electronic device, as a preview of the piece of content for the first electronic device that is different than the preview of the piece of content for the second electronic device;

at the first electronic device, presenting the second portion of the piece of content, wherein the receiving of the piece of content, identifying, storing, receiving the selection, and presenting are performed by the first electronic device; and contacting, by the first electronic device, an authorization mechanism; and receiving, from the authorization mechanism, authorization for the first electronic device to access the piece of content.

17. The first electronic device of claim 16, wherein the second portion is of a same quality as the piece of content.

18. The first electronic device of claim 16, wherein the set of instructions for identifying the piece of content as content to which the first electronic device does not have access comprises a set of instructions for identifying that the first electronic device has partial access to the piece of content, wherein the program further comprises a set of instructions for enabling access to a remainder of the piece of content that is not yet accessed by the first electronic device upon receiving the authorization to access the piece of content.

19. The first electronic device of claim 16, wherein the program further comprises a set of instructions for, upon receiving the authorization to access the piece of content, enabling access to at least one pointer that is not accessible in the second portion of the piece of content.

20. The first electronic device of claim 19, wherein the first and second portions of the piece of content are equal-duration time-based subsets of the piece of content starting at different times in a duration of the piece of content.

21. The method of claim 1, wherein the second portion of the piece of content is a time-based subset of an entire multimedia stream.

22. The non-transitory computer readable medium of claim 7, wherein the second portion of the piece of content is a time-based subset of an entire multimedia stream.

23. The first electronic device of claim 16, wherein the program further comprises a set of instructions for deauthorizing the piece of content after a period of time.

\* \* \* \* \*